Oct. 29, 1963    O. HENDERSON    3,108,418
IMPLEMENT FOR MECHANICALLY GLEANING COTTON FROM THE GROUND
Filed June 9, 1961    2 Sheets-Sheet 1

INVENTOR.
O B Henderson
BY Scott L. Norvell
Atty.

Oct. 29, 1963  O. HENDERSON  3,108,418
IMPLEMENT FOR MECHANICALLY GLEANING COTTON FROM THE GROUND
Filed June 9, 1961  2 Sheets-Sheet 2

INVENTOR.
O. B. Henderson
BY Scott L. Norvell
Atty.

United States Patent Office 3,108,418
Patented Oct. 29, 1963

3,108,418
IMPLEMENT FOR MECHANICALLY GLEANING
COTTON FROM THE GROUND
OB Henderson, 110 N. 2nd St., Buckeye, Ariz.
Filed June 9, 1961, Ser. No. 116,111
3 Claims. (Cl. 56—28)

This invention concerns an implement for mechanically picking up cotton from the ground.

One of the objects of the invention is to provide means for picking up cotton from between the rows of cotton plants by mechanical and suction means automatically as the machine is advanced over the field.

Another object is to provide a cotton picking and gleaning implement which has a suction device consisting of a semi-sphere shaped gleaner which has holes at close intervals positioned around its annulus and means for inducing a draft of air through the holes and for rolling the sphere over the ground where cotton has fallen so that tufts of cotton cling to the outer surface of the sphere, then removing the cotton by a suction applied to the outer surface of the annulus of the sphere and transporting it through a tube to a screen receiving cage.

Still another object is to provide means for rolling the device over or just above the ground from which cotton is to be salvaged and causing the cotton to adhere to the outer surface of a sphere having a perforated peripheral surface and then removing the cotton from the peripheral surface by temporarily shutting off the suction from the peripheral surface and creating a greater suction in a receiving chamber on the outside of the sphere and thence removing the cotton to a container.

Still another object includes the sphere above mentioned and means for transporting it through a cotton field and for regulating its height from the ground.

Still another object is to provide a sphere, as above stated, having means for driving blowers to produce vacuum within the sphere and to produce vacuum in the receiver to remove cotton from the outside of the sphere.

Still another object is to provide means for transporting and moving the device above described through a field from which cotton is to be gleaned and for providing power means to energize the suction fans necessary to produce the drafts, including suction and positive pressure to move the cotton from the pick-up device to a storage cage contained on a traction device attached to the gleaning device.

Other objects will appear hereinafter.

I attain the foregoing objects by means of the implement and devices, parts and combinations of parts shown in the accompanying drawings, in which—

Similar numerals refer to similar parts in the several views.

Figure 1:
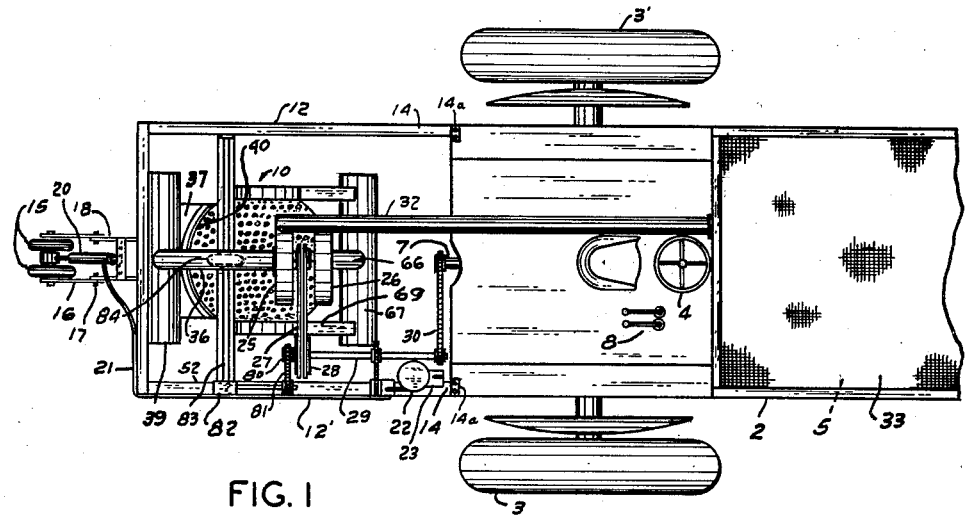
FIGURE 1 is a plan view of a tractive device attached to the cotton gleaner mechanism.
Figure 2:
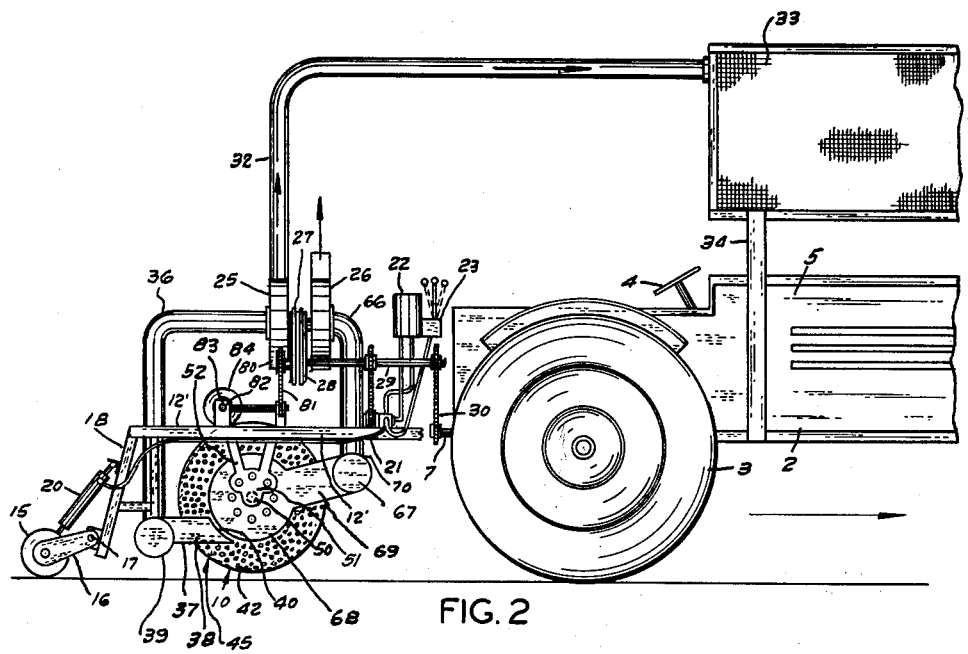
FIGURE 2 is a side view thereof.
Figure 3:
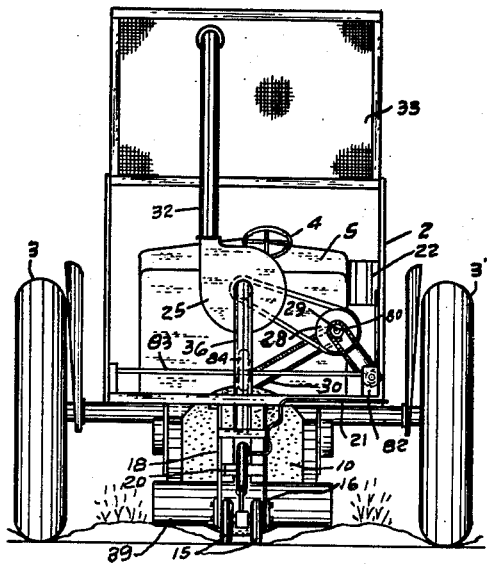
FIGURE 3 is a rear view thereof.

In the first three figures 2 indicates a tractor having drive wheels 3 and 3'; steering mechanism 4 and prime mover, such as an engine contained within the case 5. This tractor has a power takeoff shaft 7 at the rear and controls 8 within easy reach of the operator. The gleaner unit 10 is supported on a carrying frame 12 which is attached at the front 14 to the rear of the tractor body 2, by hinges 14a. This frame extends rearwardly and is supported at its rear end by small riding wheels 15 which are journalled in a frame 16 pivotally attached at 17 to substantially vertical members 18 of frame 12. A hydraulic piston and ram 20 are used to raise and lower the frame 16 in which the wheels 15 are mounted. Oil under pressure is furnished to this cylinder and piston through a pipe 21 from a reservoir 22 and controlled by valve 23. Above the frame and supported on rigid piping there are two centrifugal blowers 25 and 26. These blowers are driven by belts 27 from pulleys 28 on a jack shaft 29. This jack shaft is, in turn, driven by a chain 30 from the power takeoff shaft 7 on the rear end of the tractor body 2 and driven through control mechanism 8 within the tractor by the tractor engine 5.

Blower 25 is driven so that its outlet forces air through the pipe 32 which leads to the cotton receiving screen cage 33, positioned on framework 34 above the body 2 of the tractor. The suction of blower 25 is taken in through pipe 36 from a suction head 37 which consists of a rectangular chamber 38 extending forward from the manifold pipe 39 and having a curved front end 40 conforming to the shape of the periphery of the cotton pick-up sphere 10 throughout a level somewhat below the plane of the horizontal midsection of the sphere, and in the upper part of quadrant A.

Figure 4:
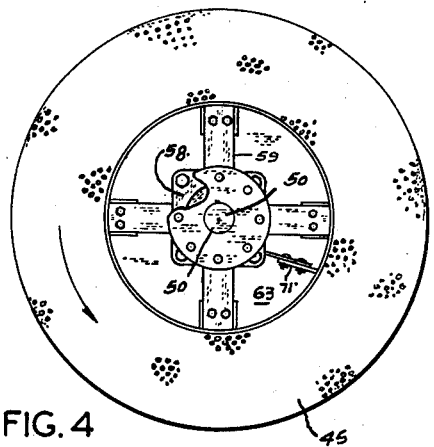
FIGURE 4 is a side elevational view of a cotton pick-up portion of the gleaner unit drawn on an enlarged scale.
Figure 5:
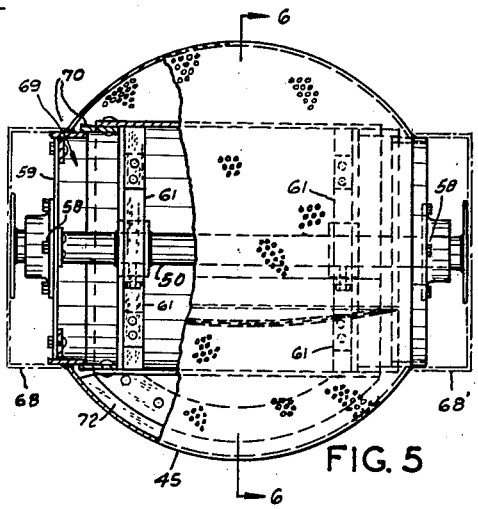
FIGURE 5 is a plan view of the gleaner device shown in FIGURE 4, with portions thereof broken away to show interior structure.
Figure 6:
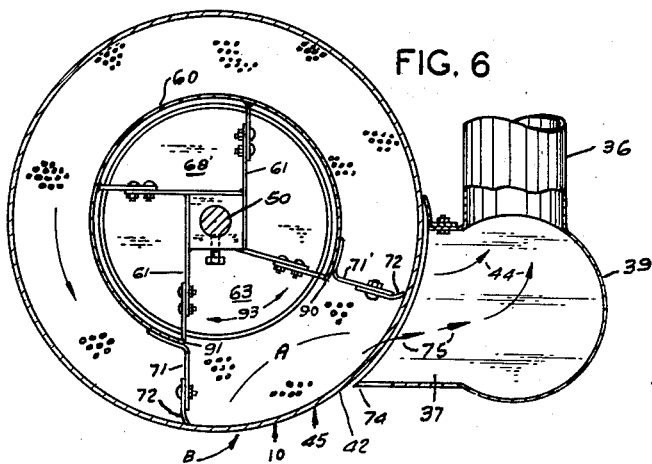
FIGURE 6 is a section of the pick-up gleaner device, said section being taken substantially on lines 6—6 of FIGURE 5.

This structure is shown particularly in FIGURES 4 and 6 wherein the chamber 37 has its front end closely contoured and disposed relative to the periphery 42 of the sphere 10. Suction is applied to the interior of the chamber 37 as indicated by arrows 44. This suction applies a draft of air which flows over the surface 45 of the lower portion of the periphery of the sphere.

The sphere is supported and journalled by spider 59 to plate 58, on axle 50 which is, in turn, supported by end plates 51 depending from framework 52, supported from the frame members 12 and 12'.

Within the sphere there is a tube 60 which is open at each end and supported by radial spokes 61 on axle 50. This tube is stationary within the sphere 10 and is open within its body throughout the lower rear quadrant 63, so that suction applied at the tube ends will be applied within said quadrant A of the sphere, and will produce suction in the holes drilled within the area 45, on the periphery of the sphere.

Suction from pipe 66 is connected through cross pipe 67 and headers 68 to the ends of the tube 60 through axial openings 69 in sphere 10. The area connected to pipe 66 is marked 63 in FIGURE 6. Air tight slip joints 70 are used to connect the ends of tube 60 to headers 68. While the sphere turns the pipes 69 connect 66 to the headers 68, which remains stationary. Within sphere 10 there are baffle plates 71 and 71' extending radially from the edges 90 and 91 of the slotted opening in tube 60. These plates have pliable outer edge strips 72 that bear on the inner surface of the sphere. These confine the suction of the area 63 in tube 60 to the segment indicated by the letter "A." In this way suction is produced on the lower peripheral surface at "B" of sphere 10 which is near the level of the ground and throughout area 45 in the lower rear sector of the sphere, and extends up to the edge 74 of chamber 37. Above the level of edge 74 suction through the chamber 37 is greater than within area 63 and tends to draw the draft outward as indicated by arrows 75. This is attained by operating blower 25 so as to produce greater suction than blower 26. Thus cotton which is held onto the outer surface of the peripheral portion 45 of sphere 10 and which is carried up toward the edge 74 is removed and drawn off by draft in the direction of arrows 75 and carried on and into pipe 36 from which it goes to cotton receiving cage 33.

This process continues as the sphere 10 is rolled over the ground, or just above it, as regulated by the small riding wheels 15 and the action of hydraulic cylinder 20.

The gleaner sphere 10 may be lowered to ground level, when desired, and it would be rotated by contact with the ground. When raised above the ground by operating hydraulic piston 20 (as shown in FIGURE 2) the gleaner is rotated by a small rubber tired wheel 84 located above the gleaner 10 on frame 12.

Wheel 84 is driven by chain 81 from sprocket 80 on jack shaft 29, and through gear box 82 and shaft 83.

In operation the tractor implement, above mentioned, is driven through the cotton fields so that the gleaner unit 10 rotates on the surface of the ground in the ditch portions between the cotton rows. It rotates either by contact with the ground or by the small wheel 84, as above explained, when the annular surface of the sphere 10 is not in contact with the ground. In either case tufts of cotton are drawn from the ground and stick to the annular surface of the sphere in the area which may be termed the equatorial area. The suction through the numerous holes in the area is sufficient only to hold the cotton on the annular surface of the sphere. The tufts of cotton are not drawn into the sphere. As the cotton tufts are attached to the outer surface of the sphere they are carried throughout the lower quadrant 45 of the sphere and lifted from the ground. As the sphere rotates further they are drawn into the manifold 39 and sucked through pipe 36, through blower 25 and discharged through pipe 32 into the receiving cage 33.

It will be observed that the outer annular surface of the sphere, above referred to, conforms substantially to the contour of the earth in the ditch between the two cotton rows. The diameter of the sphere is gaged accordingly so that it will suck all loose cotton from the area between the rows and up to the stems of the cotton plants. The tractor 2, drawing the gleaning apparatus, above described, is run over the field and throughout the length of each of the ditches between the cotton plants until all loose cotton is removed. It is to be understood that the description and drawings herewith are illustrative only and if so desired a gang of gleaning spheres may be used so that several rows can be gleaned of loose cotton at the same time.

I claim:

1. In combination with a tractive implement having an engine, and a cotton receiving cage, a cotton gleaner composed of a carrying frame having a forward end and a rearward end, movably supported at the forward end to the rear of said implement and at the rear end by riding wheels, a transverse stationary shaft mounted on said frame, a substantially spherical gleaner unit, journalled to rotate on said shaft, having an annulus to substantially conform to a cotton field row, a plurality of suction holes around its said periphery, and axial openings having edges, a stationary cylinder mounted on said shaft within said unit, having a slot opening in the lower rear quadrant of said cylinder, baffle plates extending radially from the edges of said slot, flexible edge seals on the outer edges of said baffle plates bearing on the inner surface of said sphere, headers on the end portions of said shaft connected by air tight slip joints to the edges of the axial openings in said sphere, a suction blower mounted on said frame and driven by said engine, piping connecting the inlet of said blower to said headers to produce suction in the holes in the lower rear quadrant of said spherical unit, a cotton removing chamber having an inlet opening conforming to the contour of the annulus of said sphere and disposed adjacent the upper portion of the lower rear quadrant of said sphere, a cotton removing blower mounted on said frame and driven by said engine, piping connecting the suction inlet of said blower to said chamber, piping connecting the outlet of said blower to the cotton receiving cage on said implement.

2. The mechanism described in claim 1 in combination with riding wheels pivotally attached to said frame, and a hydraulic piston and cylinder for raising and lowering said frame to vary the height of the lower surface of the sphere with reference to the ground.

3. The mechanism described in claim 1 in combination with riding wheels pivotally attached to said frame, and a hydraulic piston and cylinder for raising and lowering said frame to vary the height of the lower surface of the sphere with reference to the ground in combination with means for rotating said sphere including a friction wheel bearing on its peripheral surface and drive means connecting said wheel operatively with said engine in said implement.

References Cited in the file of this patent

UNITED STATES PATENTS 2,896,398    Green _____ July 28, 1959